Jan. 13, 1942.   E. S. SMITH   2,269,959

TEMPERATURE CONTROL

Filed March 18, 1940

Inventor
E. S. Smith
by J. Edw. Maybee
ATTY

Patented Jan. 13, 1942

2,269,959

UNITED STATES PATENT OFFICE 2,269,959

TEMPERATURE CONTROL

Elmore Stanley Smith, Weston, Ontario, Canada, assignor to Moffats Limited, Weston, Ontario, Canada Application March 18, 1940, Serial No. 324,498

10 Claims. (Cl. 200—139)

This invention relates to apparatus for automatically controlling the temperature of an electric stove oven to maintain the latter at a predetermined temperature and my object is to provide a simple, compact and rugged device of this character for quickly heating the oven to the desired temperature and thereafter maintaining the oven at that temperature by using a slower heat. A further object is to provide means for audibly indicating when the oven has reached the desired temperature.

I attain my object by providing a main switch which is manually settable to any one of a plurality of positions such as "high," "bake," "grill" or "off." If the oven has top and bottom elements, they will both be energized when the switch is set at "high," the bottom element only will be energized when the switch is set at "bake," the top element only will be energized when the switch is set at "grill," and both elements will be de-energized when the switch is turned to "off" position. The switch is releasably locked in its "high" position against the tension of a spring which tends to turn the switch to its "bake" position. When the temperature of the oven reaches a predetermined point, the locking mechanism is automatically released whereby the switch is automatically changed to "bake" position to permit only the bottom element to be energized until such time as the switch is manually re-set to a different position.

The constructions are hereinafter more fully described and are illustrated in the accompanying drawing in which Fig. 1 is a front view of the device;

Figure 1:
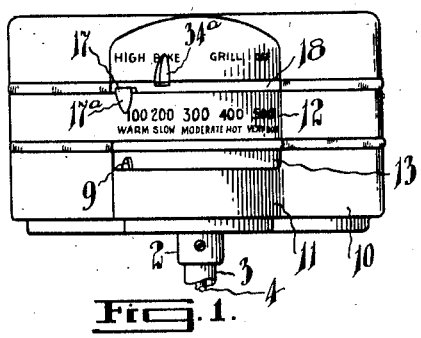
Figure 2:
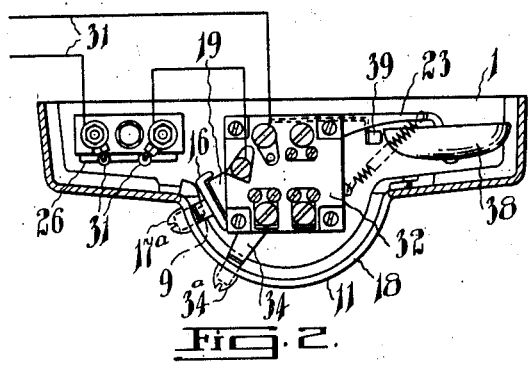
Fig. 2 is a plan view, on an enlarged scale, the cover being shown in section.
Figures 3, 4:
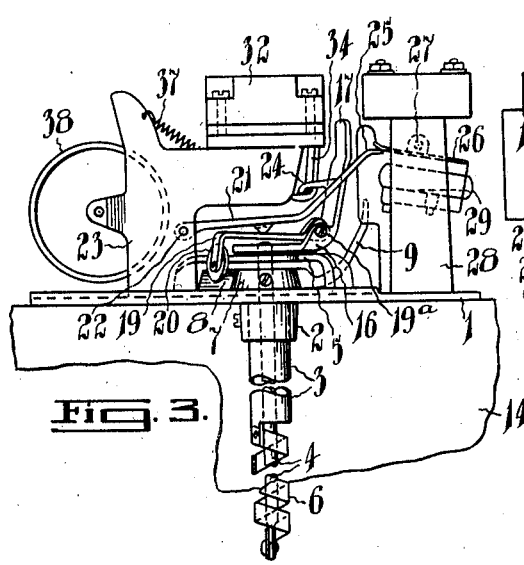
Fig. 3 is a rear view of the parts shown in Fig. 2, the cover being removed, the manual switch arm released and the mercury switch being in its "off" position.
Fig. 4 is a front view of the device with the cover removed, the manual switch being locked in its "high" position and the mercury switch being in its "on" position.
Figure 5:
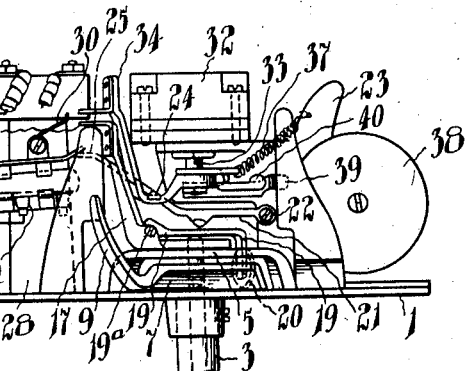
Fig. 5 is a horizontal sectional detail showing the locking mechanism for the manual switch.
Figure 6:
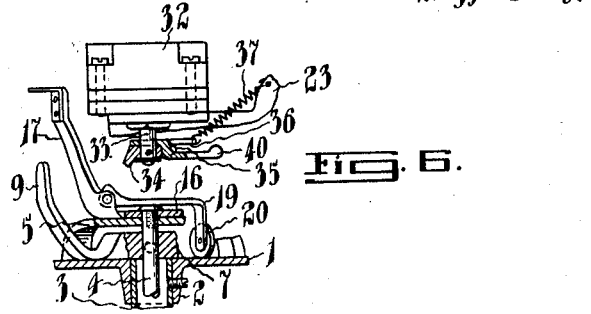
Fig. 6 is a vertical sectional detail showing the parts assembled on the thermostatically operated spindle and on the spindle of the manual switch.

On the underside of the base plate 1 is a boss 2 in which is secured a tube 3. A spindle 4 passes through the tube and boss and is journalled in a bracket 5 secured to the upper side of the plate 1. One end of a bi-metallic thermostatic coil 6 disposed on the spindle is secured to the lower end thereof and the coil is secured to the adjacent end of the tube 3. To the other end of the spindle 4, above the plate 1 and beneath the bracket 5, is secured an operating member 7 having an inclined face 8 and an indicating finger 9. The front of the cover 10 of the device is curved at 11 concentric to the axis of the spindle 4 and is provided with a dial 12. The curved portion 11 just beneath the dial has a skirt portion 13 which is set in from the dial and is open at its lower end to permit the passage of the free end of the finger 9 across the skirt portion 13. The temperature of the oven 14 in which the coil 6 depends is thus indicated by the finger 9 on the dial 12. The plate 1 is secured to the top of the stove above the oven and adjacent the usual splash plate.

On the upper end of the spindle 4 above the bracket 5 is journalled a regulator 16 having an index finger 17 which projects through a slot 18 in the curved portion 11 of the cover. The slot is just above the dial 12 and the finger 17 has a removable pointer 17a secured to the underside thereof to lie close to the dial. The operator may thus set the regulator 16 to any desired temperature by merely moving the pointer 17a across the dial. On the regulator is pivoted at 19a a lever 19 which carries an anti-friction roller 20 for engagement by the inclined face 8 on the operating member 7. The roller 20 normally rests on the upper surface of the plate 1 and, as the operating member 7 is turned by the thermostatically actuated spindle 4, the face 8 passes beneath the roller to cause the lever 19 to be rocked on its pivot. The lever is adapted to engage a latch arm 21 pivoted at 22 on a support 23. The arm is provided with a latch 24, for a purpose which will hereinafter appear, and with a part 25 for engaging a switch carrier 26.

The carrier 26 is pivoted at 27 on a switch support 28 and carries a mercury switch 29 of well known construction. A light spring 30 engaging the carrier and a suitable stationary part tends to rock the switch to its position for closing the supply circuit 31 leading to the heating elements (not shown). When the latch arm 21 is raised by the lever 19, the switch carrier 26 is rocked to tilt the switch 29 to its position for opening the supply circuit 31. As the switch is tilted the mercury runs to one end of the switch tube and breaks the connection between the switch contacts which are connected in the supply circuit 31.

A main switch 32 is also connected in the supply circuit 31 to control the energizing of the heating elements. The current from the normally closed mercury switch 29 passes to the main switch 32 whereby the supply of energy, which is controlled by the mercury switch, is distributed by the main switch to the desired element or elements. The main switch 32 may be of any well known type having a manually operable spindle 33 which when turned to different positions will control the supply of energy to different resistance wires. Such switches are so constructed that they will remain in a set position until they are moved to a fresh position. However, in the switch 32, the mechanism (not shown) for retaining the switch in its set positions has been changed so that the switch will not of itself remain in the "high" position but otherwise the switch has not been altered.

The hereinbefore mentioned switch positions "high," "bake," "grill" and "off" are marked on the curved portion 11 above the slot 18. To the spindle 33, which is axially alined with the spindle 4, is secured a manually operable arm 34 which projects through the slot and is provided with a removable pointer 34ª which is directed upwardly to register with the indicia "high" or "bake" etc. when the pointer is moved to one of these positions. When the pointer is set at the "high" position, current will be supplied to the top and bottom oven heating elements (not shown), assuming the switch 32 is held in this position and the mercury switch 29 is closed. The latch 24 on the latch arm 21 is adapted to releasably engage and hold the switch arm 34 when it is moved to "high" position. Thus the main switch 32 is releasably locked in said set position and is automatically released when the latch arm 21 is raised to tilt the mercury switch 29 to its open position.

The manually operated switch arm 34 is provided with a lug 35 adapted to engage a member 36 journalled on the main switch spindle 33 as the arm 34 is moved from the "bake" position to the "high" position. To the member 36 is connected one end of a spring 37, the other end of which is connected with the support 23 for the main switch 32. The spring 37 is tensioned during the movement of the arm 34 from "bake" to "high" positions and when the latch 24 is moved to release the arm 34 from its "high" position, the spring actuated member 36 automatically returns the arm 34 to "bake" position in which only the bottom oven heating element will be energized to maintain the oven at the temperature indicated by the regulator 16. It will be understood that the switch arm 34 may be freely moved from "bake" to "grill" or to "off" positions without the lug 35 engaging the spring actuated member 36.

When it is desired to use the oven for baking or cooking purposes, the regulator pointer 17ª is set to the temperature at which it is desired to maintain the oven. The manual switch 32 is then set at "high" by moving its pointer 34ª to this position in which the switch arm 34 is releasably locked by the latch 24. Maximum heat is then supplied to the oven so that it will be heated to the desired temperature in a minimum period of time. As the temperature of the oven rises, the indicating finger 9 moves across the dial 12 and when it reaches the temperature indicated by the regulator pointer 17ª, the inclined face 8 on the operating member 7 will pass beneath the roller 20 to cause the lever 19 to be rocked. The latch arm 21 is thus actuated to tilt the mercury switch 29, which opens the supply circuit to the main switch 32, and to release the latch 24 from engagement with the main switch arm 34. The spring actuated member 36 which engages the lug 35 on the switch arm 34 causes the latter to be moved to "bake" position in which position it is releasably retained by the usual switch mechanism until it is manually reset. When the oven cools below the point set by the regulator pointer 17ª, the roller 20 is lowered down the inclined face 8 to rock the lever 19 and permit the latch arm 21 to be lowered whereupon the part 25 will permit the spring 30 to return the mercury switch 29 to its closed position. Current will now flow through the main switch 32 to the bottom oven element which alone is used to bake or cook.

The preferred arrangement is to heat the oven to the desired temperature and place the food to be cooked into the oven after the main switch has been changed from "high" to "bake" positions. To save time and electricity, I provide audible means to indicate when the oven has reached the temperature set by the regulator 16. This means comprises a bell 38 and a striker 39 which is actuated by a finger 40 on the member 36 when the latter is moved by its spring 37 to shift the switch arm 34 from "high" to "bake" position. The operator may thus attend to some other duty, while the oven is being heated to the desired temperature, and will be reminded by the bell to insert the food to be cooked in the oven.

What I claim as my invention is:

1. A temperature indicator and control comprising a manually operable switch adapted to be set to any one of a plurality of on positions; means tending to move the switch from one on position to another on position; means for releasably locking the switch in its first mentioned on position; thermostatic means for indicating temperature; a normally closed switch for controlling energy to the first mentioned switch; an operating member movable by the thermostatic means; a manually movable regulator adjustable relative to the operating member; and a lever pivoted on the regulator for movement relative thereto by said operating member to release the locking means and cause the second switch to be opened.

2. A temperature indicator and control comprising a manually operable switch adapted to be moved to a plurality of different on positions; a normally closed tiltable switch for controlling energy to the first mentioned switch; means tending to move the first mentioned switch from one on position to another on position; means for releasably locking the first mentioned switch in its first mentioned on position; thermostatically controlled means for indicating temperature; an operating member movable by the thermostatic means; a manually movable regulator adjustable relative to the operating member, the said locking means including a part adapted to engage the second mentioned switch to cause it to be tilted to its open position; and a lever pivoted on the regulator for movement relative thereto by said operating member to release the locking means and move the said part to open the second switch, the lever being movable with the regulator so that the extent of movement of the operating member relative to the lever necessary to release the locking means and open the second switch may be varied.

3. A temperature control comprising a switch having a plurality of different on positions; a dial having a plurality of switch setting positions thereon corresponding to said positions of the switch; a manually operable arm for setting the switch to any desired position on the dial; a latch for engaging the arm to releasably lock the switch in one of its on positions; a spring actuated finger tending to move the arm from its latch set position to another on position of the switch and thereafter being free of the arm; theremostatic means; an operating member movable by the thermostatic means; a manually movable regulator adjustable relative to the operating member; and a lever pivoted on the regulator for movement relative thereto to disengage the latch from the arm when the temperture rises to a predetermined point.

4. A temperature control comprising a switch having a plurality of different on positions; a dial having a plurality of switch setting positions thereon corresponding to said positions of the switch; a manually operable arm for setting the switch to any desired position on the dial; a latch for engaging the arm to releasably lock the switch in one of its on positions; a spring actuated finger tending to move the arm from its latch set position to another on position and thereafter being free of the arm; thermostatic means for indicating temperature; a normally closed switch for controlling energy to the first mentioned switch; an operating member movable by the thermostatic means; a manually movable regulator adjustable relative to the operating member; and a lever pivoted on the regulator for movement relative thereto by said operating member to release the locking means and cause the second switch to be opened.

5. A temperture indicator and control comprising a rotatable spindle; thermostatic means for controlling the rotary movements of the spindle; an operating member secured to the spindle and having an inclined face; indicating means comprising a pointer carried by the operating member and a dial; a regulator journalled on the spindle; a normally closed fluid contact switch pivotally mounted on a stationary part; a spring tending to turn the switch to its closed position; a lever pivoted on the regulator for movement relative thereto by said inclined face; and an arm pivoted on a stationary part for engagement by the lever and adapted to engage the switch to cause it to be rocked to its open position.

6. A temperature indicator and control comprising a rotatable spindle; thermostatic means for controlling the rotary movements of the spindle; an operating member secured to the spindle and having an inclined face; indicating means comprising a pointer carried by the operating member and a dial; a regulator journalled on the spindle; a normally closed fluid contact switch pivotally mounted on a stationary part; a spring tending to turn the switch to its closed position; a switch having a manually operable spindle for setting the switch to any one of a plurality of on positions indicated on the dial, the last mentioned spindle being substantially in axial alinement with the first mentioned spindle; an arm secured to the spindle for actuating it, the arm having an indicator movable across the dial; means for releasably locking the arm to retain the second switch in one of its on positions; means tending to move the arm from said locked position to another on position so that the second switch will be re-set, the releasable locking means having provisions for engaging the fluid contact switch to rock it to its open position; and a lever pivoted on the regulator for movement relative thereto by said inclined face to move the locking means out of engagement with the switch arm and cause the fluid switch to be rocked to its open position.

7. A temperature indicator and control comprising a switch having a plurality of different on positions; a manually operable arm adapted to be turned to set the switch to any one of said positions; spring means tending to turn the arm from one on position to another on position; a latch for engaging the arm to releasably lock the switch in said first mentioned on position; a dial having temperature graduations; a manually operable regulator adapted to be turned to any desired temperature on the dial; thermostatically controlled means for indicating temperature on the dial; and means, movable by the thermostatic means, co-operating with the regulator to release the latch and cause the switch to be moved from the first mentioned on position to the other on position when the temperature indicating means rises to the point set by the regulator.

8. A temperature indicator and control comprising a switch having a plurality of different on positions; a manually operable arm adapted to be turned to set the switch to any one of said positions; spring means tending to turn the arm from one on position to another on position; a latch for engaging the arm to releasably lock the switch in said first mentioned on position; a dial having temperature graduations; a manually operable regulator adapted to be turned to any desired temperature on the dial; a normally closed switch for controlling energy to the first mentioned switch; thermostatically controlled means for indicating temperature on the dial; and means, movable by the thermostatic means, co-operating with the regulator to release the latch and cause the second mentioned switch to open when the temperature indicating means rises to the point set by the regulator.

9. A temperature indicator and control comprising a switch having an off and a plurality of different on positions; a manually operable arm adapted to be turned to set the switch to any one of said positions; a latch for engaging the arm to releasably lock the switch in one of its on positions; a member adapted to move the switch from its first mentioned on position to another on position; a spring for actuating said member, the member being engaged by the arm to tension the spring as the switch is moved from said other on position to its releasably locked on position; a dial having temperature graduations; a manually operable regulator adapted to be turned to any desired temperature on the dial; thermostatically controlled means for indicating temperature on the dial; and means, movable by the thermostatic means, co-operating with the regulator to release the latch and cause the switch to be moved from the first mentioned on position to the other on position when the temperature indicating means rises to the point set by the regulator.

10. A temperature indicator and control comprising a switch having a plurality of different on positions; a manually operable arm adapted to be turned to set the switch to any one of said positions; spring means tending to turn the arm from one on position to another on position; a latch for engaging the arm to releasably lock the switch in said first mentioned on position; a dial having temperature graduations; thermostatically controlled means for indicating temperature on the dial; an operating member movable by the thermostatic means; a manually movable regulator adjustable relative to the operating member to any desired temperature on the dial; and a lever pivoted on the regulator for movement relative thereto by said operating member to release the latch from the arm and cause the switch to be moved from the first mentioned on position to the other on position, the lever being movable with the regulator so that the extent of movement of the operating member relative to the lever necessary to release the latch may be varied.

ELMORE S. SMITH.